United States Patent [19]
Orloff

[11] 3,915,572
[45] Oct. 28, 1975

[54] COMBINED DUAL SCATTER, LOCAL OSCILLATOR LASER DOPPLER VELOCIMETER

[75] Inventor: Kenneth L. Orloff, Cupertino, Calif.

[73] Assignee: The United States of America as represented by the National Aeronautics and Space Administration Office of General Counsel-Code GP, Washington, D.C.

[22] Filed: Feb. 27, 1974

[21] Appl. No.: 446,562

[52] U.S. Cl. .............................. 356/106 R; 356/28
[51] Int. Cl.² ....................... G01B 9/02; G01P 3/36
[58] Field of Search............ 356/28, 106 R, 114, 103

[56] References Cited
UNITED STATES PATENTS

| | | | |
|---|---|---|---|
| 3,649,125 | 3/1972 | Lehmann | 356/28 |
| 3,753,616 | 8/1973 | Goethert | 356/28 |
| 3,825,346 | 7/1974 | Rizzo | 356/106 R |

Primary Examiner—Ronald J. Stern
Assistant Examiner—Conrad I. Clark
Attorney, Agent, or Firm—Darrell G. Brekke; Armand G. Morin, Sr.; John R. Manning

[57] ABSTRACT

A laser Doppler velocimeter is described which is capable of effectively measuring two different velocity components of a fluid simultaneously. Such a velocimeter includes a pair of coherent beams of laser light which are focused to an intersection point through which flow particles within the fluid whose velocity is to be measured. Both beams are plane polarized with the plane of polarization of one being rotated normally with respect to the other, with the result that the scattered radiation is separable into two different beams respectively corresponding to the two incident beams. Such scattered radiation is Doppler shifted by the moving particles and is collected for conventionally providing a measurement of the velocity of any particle flowing through the intersection point on a path which is generally transverse thereto. Moreover, the wavelength of the light scattered by the particles from one of the beams is compared to the wavelength of such beam prior to it being Doppler shifted by the moving particles. This comparison provides a measurement of another component of the particle velocity, which measurement can be combined with the first measurement to provide a resultant velocity in a two-dimensional reference frame.

14 Claims, 2 Drawing Figures

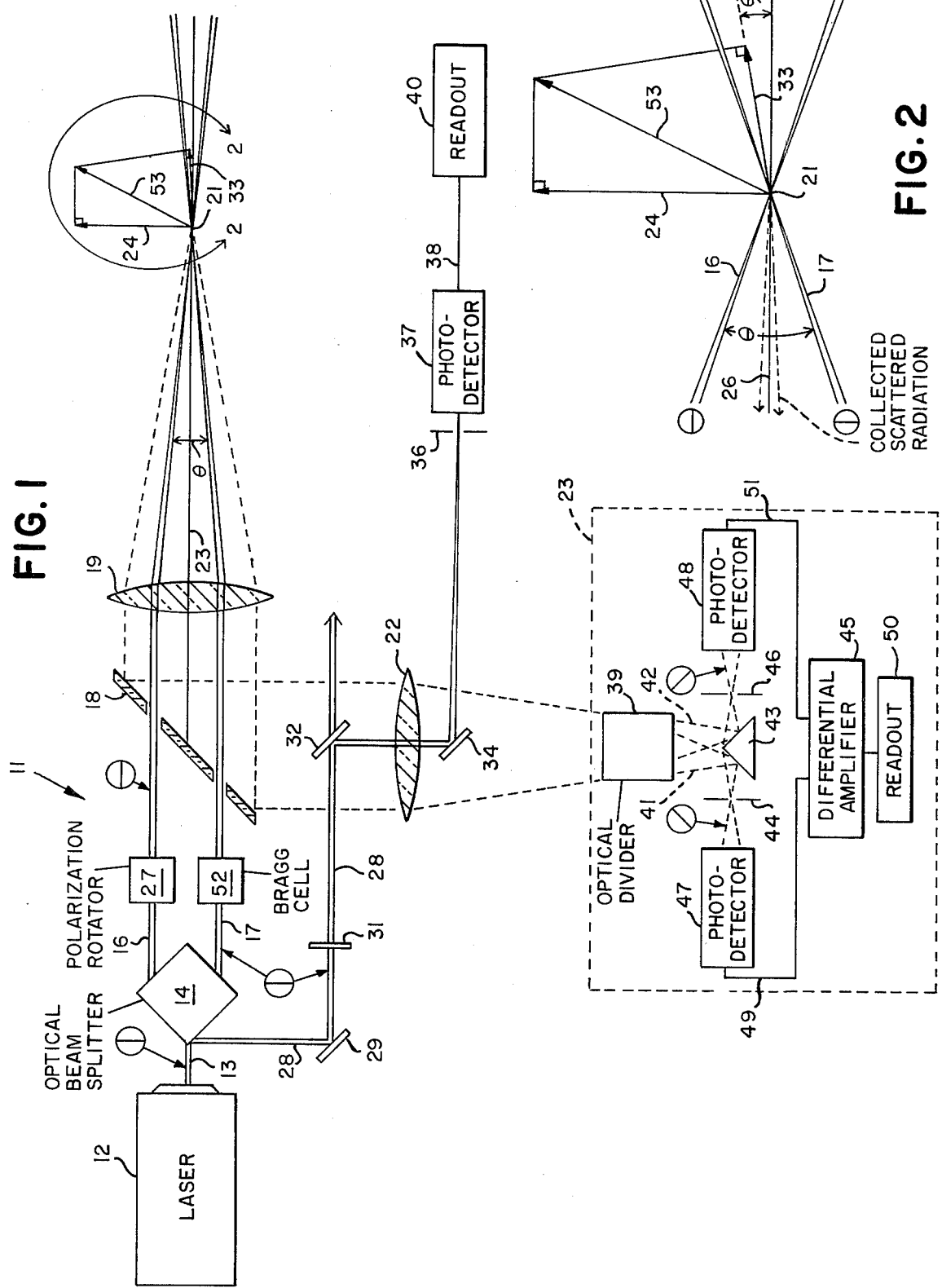

COMBINED DUAL SCATTER, LOCAL OSCILLATOR LASER DOPPLER VELOCIMETER

The invention described herein was made by an employee of the United States Government and may be manufactured and used by or for the Government for governmental purposes without the payment of any royalties thereon or therefor.

BACKGROUND OF THE INVENTION

This invention relates to a laser Doppler velocimeter of the type used to measure a localized fluid velocity and, more particularly, to such a velocimeter which is capable of effectively measuring two different velocity components simultaneously.

Laser Doppler velocimeters (LDV's) are finding increasing use to optically measure the velocity of flow of a liquid. Such a velocimeter can provide a dynamic measurement of flow velocity without requiring a probe or other structure to be located in the flow and disturbing it. Very basically, a laser velocimeter provides a velocity measurement of a liquid by focusing one or more coherent beams of laser light onto a point within a fluid stream containing particles having diameters of the order of the laser light wavelength. Such particles will "scatter" the light radiation by the Mie scattering process, and shift its wavelength by an amount dependent upon its velocity and, hence, the velocity of the fluid. Such Doppler shifting of the wavelength is measured by various techniques to provide a scaler measurement of the velocity of the particle along at least one path.

Most modern laser Doppler velocimeters are of the so-called "dual scatter" kind because of the relatively high signal-to-noise ratio and sensitivity of such instruments. Such instruments include a pair of coherent beams which are focused to a crossing point at the location at which it is desired that the velocity of the fluid flow be measured. A fringe field is thereby formed at the beam crossing location due to beam interference. As a particle within the fluid moves through such fringe field, the light intensity scattered therefrom is modulated at a frequency which is proportional to the scaler component of the velocity of such particle in a direction which lies in a plane normal to the bisector of the angle formed between the pair of beams at their point of incidence on the particle. Collection of such Doppler shifted scattered light radiation by a photodetector provides a measurement of such velocity component.

The type of dual scatter velocimeter which is preferred for most current applications is the so-called confocal back-scatter on-axis velocimeter, i.e., a velocimeter which uses a common lens for both transmission of the output beams and collection of "back scattered" Doppler shifted radiation.

In general, dual-scatter velocimeters available heretofore measure only one component of the velocity of the flow. Thus, to obtain a true indication of the flow velocity, a plurality of velocimeter systems must be provided, all focused on the same location in the flow to separately measure different velocity components which can be combined to provide the actual velocity. This utilization of a plurality of systems not only increases the expense due to system duplication, but also reduces the accuracy of the velocity determination due to the adding of potential errors in the systems. Moreover, in some of such systems, each of the detectors receives more than one of the Doppler shifted beams, with the result that expensive, special discrimination electronics or optics must be used before reliable measurements can be obtained. In addition and perhaps most significantly, presently available dual-scatter back-scatter velocimeters are incapable of measuring the velocity component which lies directly along the axis of the system formed by the plane of the two beams, thus making a measurement of the vector velocity quite difficult.

SUMMARY OF THE INVENTION

The present invention provides a combined dual-scatter, local oscillator Doppler velocimeter capable of simultaneously generating signals representative of components of the flow velocity in directions both transverse to and along the transmitting axis of the system. The velocimeter of the invention provides these simultaneous velocity component indications in a simple and straight-forward manner not requiring a duplication of systems. In its basic aspects, the velocimeter of the invention includes, as is conventional, means for generating a first pair of beams of electromagnetic radiation which are coherent with respect to one another, and means for focusing both of such beams onto a particle whose velocity is to be measured so that the electromagnetic radiation scattered by such particle is Doppler shifted. The velocimeter further includes, as is usual in a dual-scatter velocimeter, means for collecting at least a portion of the scattered radiation to provide a measurement indicative of the scaler component of velocity of the particle along a first path which lies in a plane normal to the bisector of the angle formed between the pair of beams at their point of incidence on the particle and within the plane formed by these beams (transverse component).

As a salient feature of the instant invention, it further includes means for comparing the Doppler shifted wavelength of the radiation scattered by the particle from one of the transmitted beams with the wavelength of such beam prior to such Doppler shift. This comparison provides a measurement of a velocity component of the particle along the transmitting axis. Two separate scalar velocity components along known paths are thus obtainable with the one velocimeter system to enable calculation of the true path and speed of the particle in two-dimensional flow.

It will be appreciated from the above that in order to enable the electromagnetic radiation scattered from only one of the beams by the particles to be compared with such radiation prior to being scattered, it is necessary that the radiation scattered from one such beam be separable from the remaining scattered radiation. It has been found that such separation is simply obtainable by plane polarizing into differing directions of polarization the two incident coherent beams of electromagnetic radiation. The scattered electromagnetic radiation will be similarly polarized in differing directions, thereby enabling the scattered electromagnetic radiation from one of the beams to be separated with a polarized beam selector of one sort or another from the remaining scattered radiation. In this connection, although polarization of the coherent beams of dual scattering velocimeter has been effected in the past, the purpose of doing so has been to provide separate signals representative of the same velocity component to enhance the measurement of such component by subtracting out unwanted interference common to both signals, not for the purpose of enabling two separate velocity components to be detected. However, such a differencing technique can be simply incorporated into the instant invention to make dual usage of the incident beam polarization difference as will be described.

As another salient feature of the instant invention, it also enables the direction of each of the velocity components to be determined along with a determination of their paths and scaler sizes. More particularly, means are also included for shifting the frequency of one of the first pair of coherent beams relative to the other to thereby directionally bias the scattered electromagnetic radiation providing the measurement indicative of the scaler component of velocity along the first path. The Doppler shifted beam will thereby also be frequency shifted an equal amount so that the Doppler shifted frequency is added to or subtracted from the direction frequency shifting, depending upon the flow direction along the path. Most desirably, the frequency shifting for directional bias is performed on a first portion of one of the beams which is to be focused onto the particle for Doppler shifting, and a second unshifted reference portion of such same beam is compared with the Doppler shifted wavelength of the first beam to provide the measurement indicative of the component of velocity along the second path. This will result in both of the measurements of velocity components being directionally biased to provide the true vector velocity of the particle and, hence, of any liquid it is flowing with, in two-dimensional flow. Such directional biasing of both measurements to provide the true vector velocity is obtained with a single frequency shift, when such shift is applied to the first portion of the one of the beams which is used in providing both measurements of velocity components.

The invention includes other features and advantages which will become apparent from the following more detailed description of a preferred embodiment.

BRIEF DESCRIPTION OF THE DRAWING

With reference to the accompanying single sheet of drawing:

FIG. 1 is a system diagram of a preferred dual scatter, Doppler velocimeter of the invention; and FIG. 2 is an enlarged view of that portion of FIG. 1 presenting a graphical representation of the two velocity components of a moving particle measured by the preferred embodiment of the velocimeter of the invention.

DETAILED DESCRIPTION OF THE PREFERRED EMBODIMENT

With reference to FIG. 1, a dual scatter laser Doppler velocimeter of the confocal, back-scatter on-axis type, incorporating the present invention, is generally referred to by the reference numeral 11. As mentioned before, a confocal, back-scatter on-axis velocimeter differs from a dual-scatter velocimeter having a forward scatter, off-axis configuration, in that such a back-scatter velocimeter uses a common lens for both transmission of the coherent beams which are focused onto a particle and collection of the scattered electromagnetic radiation therefrom.

As is conventional for dual scatter velocimeters, velocimeter 11 includes means for generating a first pair of beams of electromagnetic radiation which are coherent with respect to one another. More particularly, a laser 12 capable of emitting a continuous beam of light, such as an argon laser, directs its output beam 13 of light radiation onto an optical beam splitting cube 14 which acts as means for dividing the output of such laser into a pair 16 and 17 of coherent beams of radiation. As is illustrated, such beams pass through suitable transmission apertures within a mirror 18 for focusing by a lens system represented schematically by convex lens 19 to a point at 21. The system should be positioned to place the point of intersection 21 at the point at which it is desired to measure particle velocity.

Because the beams 16 and 17 are coherent, a fringe pattern is formed at the point of intersection 21. As a particle moves through such fringe pattern, the light scattered therefrom is frequency modulated by reason of the particle velocity. Thus, light collected from the intersection point includes a frequency component which provides a measurement indicative of a scalar component of the velocity of such particle. The velocimeter therefore includes means for collecting at least a portion of the light scattered by the particle or particles moving through point 21 to provide such a measurement. That is, the portion of such light which is scattered rearwardly from a moving particle is gathered by lens 19 and is directed as parallel wavefronts onto mirror 18. Mirror 18 is oriented with respect to such light to reflect the same through a collecting lens system, represented schematically by the convex lens 22 for focusing onto means 23 for measuring the modulation frequency and obtaining the desired measurement, which means will be described in detail hereinafter.

As described to this point, the velocimeter 11 is of a conventional nature. The major problem of conventional dual scatter velocimeters, though, is that such velocimeters including only the structure described, are merely capable of determining the scalar amount of that component of the particle velocity which extends along the path of line 24 (see FIG. 2). As can be seen, such path is in a plane normal to the bisector of the angle $\theta$ formed between the beams 16 and 17 at their crossing point 21. In order to obtain a measurement more representative of the full vector velocity, the art has generally turned to velocimeters which include a duplication of the system described to provide measurements of velocity components extending along additional paths. Such duplications are both expensive, subject to greater error, and lack sensitivity in at least one of the velocity components. Moreover, they generally do not provide means for determining the direction of the velocity.

The Doppler velocimeter 11 includes means for obtaining a scaler measurement of the velocity of the particle along a second path, as well as means for determining the vector direction of the two components of velocity, thereby enabling the same to provide a measurement indicative of the full vector velocity of the particle in two-dimensional flow. In this connection, it is important that light scattered from the particle corresponding to one of the coherent beams of incident light be separable from the remainder of such scattered light. To provide such separability, the beams 16 and 17 are made plane polarized beams having differing directions of polarization. More particularly, as is known, the output beam from a laser, such as beam 13, is plane polarized. When such beam is divided by splitter 14 into the beams 16 and 17, such beams will also be plane polarized with the same direction of polarization as the original beam 13. A light beam polarization rotator 27, such as a half-wave plate, is therefore disposed to intercept the beam 16 and rotate its plane of polarization. While various differing degrees of relative rotation of the beams 16 and 17 could be used, optimum sensitivity and distinguishability are obtained if the planes of polarization of the two beams are at right angles to one another. Thus, the rotator 27 rotates the plane of polarization of beam 16 90° to be orthogonal with respect to that of the beam 17.

At the intersection 21, two sets of fringes of maximum contrast are produced, each of which sets is observable at different angles of observation with respect to either of the incident polarization directions. When the planes of polarization of the incident beams are orthogonal with respect to one another as in this preferred embodiment, the two directions at which the fringes of maximum contrast are observable are along the planes midway between the two planes of polarization of the incident beams, i.e., at +45° and −45° with respect to either of the incident beam polarization directions.

Most importantly, the two sets of fringes are displaced from each other. This means that the Doppler shifted beam generated by each set of fringes will be phase-shifted from that of the other and, thus, distinguishable therefrom. When the fringes are observed at ±45° orientations with respect to the incident beams, as is the case when the planes of polarization of the interfering beams are orthogonal, such fringe patterns are displaced from one another by one-half of the fringe spacing. The Doppler shifted beams are thus phase-shifted with respect to one another by 180°.

To provide a measurement of the scalar component of the particle velocity along a path which does not lie in a plane normal to the bisector 26, means are provided for comparing the Doppler shifted wavelength of the radiation scattered from one of the beams 16 and 17 with the wavelength of such beam prior to such Doppler shift. More particularly, a reference beam 28 is obtained as a spurious reflection from the splitter cube 14. Such reference beam will have the same plane of polarization as the output beam 13 from the laser and, hence, of the beam 17 to thereby be, in effect, a portion of such beam 17. The reference beam 28 is reflected via a mirror 29 for passage through a neutral density filter 31 and impingement on a low reflection substrate mirror 32. As is illustrated, mirror 32 is positioned along the optical axis of collecting lens 34 for reflecting a portion of the beam 28 into alignment with the scattered, Doppler shifted radiation originating at the point 21. As discussed above, such scattered radiation is essentially separable into a pair of distinguishable, Doppler shifted beams which correspond individually to the beams 16 and 17. Such beams are distinguishable from one another in light of their different polarizations. However, the polarization of beam 17 will be the same as that of reference beam 28. The result is that the portion of beam 28 which is reflected into alignment with the Doppler shifted radiation will heterodyne with that portion of such radiation which corresponds to incident beam 17 to provide a resulting light signal which is modulated at a frequency dependent upon the scalar component of velocity of the particle along the path shown in FIG. 2 containing the vector 33. As is illustrated, such resultant signal is reflected by a mirror 34 through a light stop 36 for impingement on the collecting surface of a photodetector 37. The electrical signal 38 from photodetector 37 is directed to a readout 40 for amplification and subsequent display to enable measurement of the desired scalar component of the velocity.

The path along which the second velocity component is measured, i.e., the path containing vector 33, is separated from the path containing vector 24 by $90° - \theta/4$. When the angle $\theta$ is small and, hence, the angle $\theta/4$ is quite small, the paths containing the two vectors 24 and 33 can be considered orthogonal to one another within the limits of accuracy normally required. However, the exact paths are well defined and enable quite accurate computation of the resultant path when such accuracy is required. The exact on-axis velocity component can be computed from $v_{axial} = v_2 \sec \theta/2 + v_1 \tan \theta/4$ where $v_1$ is velocity component 24; $v_2$ is velocity component 33; and such components are computed from the measured Doppler frequencies:

$$v_1 = \frac{2nv_1}{\lambda_o} \sin \theta/2; \text{ and}$$

$$v_2 = \frac{2nv_2}{\lambda_o} \cos \theta/4.$$

It should be noted that the reference beam need only heterodyne with a small fraction of the back-scattered radiation to provide a sufficiently strong signal for adequate sensitivity in measuring the velocity component along the path containing vector 33. The substrate 32 is thus most desirably selected to reflect only a small percentage, e.g., four percent, of the reference beam 28, and transmit the remainder thereof as illustrated. Since only a small percentage of the reference beam is thus provided for heterodyning with a Doppler shifted beam, only a small fraction of such beam is utilized. Thus, most of the scattered radiation is still available to contribute to measurement of the velocity component along the path containing vector 24.

The distinguishability of the two Doppler shifted beams scattered from the particle also enables the velocity component of the particle along the path containing vector 24 to be determined with greater sensitivity. More particularly, the means 23 for analyzing the scattered radiation to provide a measurement of such velocity component is designed to take advantage of the two distinguishable Doppler shifted beams to eliminate undesired components of such beams common to both. More particularly, the measuring means 23 includes an optical divider 39, such as a Wollastrom prism, capable of separating the scattered radiation into the two phase shifted beams represented at 41 and 42 corresponding to the maximum contrast fringe patterns of ±45° with respect to incident polarizations. The Doppler shifted beams 41 and 42 are reflected by a prism 43 separately through light stops 44 and 46 to corresponding photodetectors 47 and 48. The resulting electrical signals represented at 49 and 51 are fed to a differential amplifier 45, for example, to obtain their difference for the purpose of cancelling any disturbance light common to both beams. The scalar component of the velocity along path 24 can be measured by a read-out 50.

It is not new, per se, to provide enhancement of the velocimeter measurement of a velocity component by such a differencing technique of differing polarized, Doppler shifted beams. Because distinguishable, Doppler shifted beams are otherwise needed for the purposes of the instant invention, the differencing technique is easily incorporated into the velocimeter 11.

As another salient feature of the instant invention, it includes means for directionally biasing the measurements of both velocity components along the paths represented by the vectors 24 and 33 to thereby provide such vectors and enable the true velocity of such particle in two dimensions to be easily determined. More particularly, means are included for slightly shifting a predetermined amount of the frequency of the beam 17 relative both to the beam 16 and to the reference beam 28. The degree of frequency shifting should be much greater than that frequency shifting expected of the scattered radiation due to the Doppler effect.

To provide the frequency shift, a Bragg cell 52 is positioned within the path of beam 17 prior to its incidence on any particle at point 21. The Doppler shifted radiation corresponding to the beam 17 which is scattered from the particle will be similarly frequency shifted. The result is that the Doppler frequency shifting will thus be added to, or subtracted from the Bragg cell frequency shifting, depending upon the direction of the particle flow, and hence will enable the direction of the respective velocity components to be determined. With knowledge of both the scalar amount and direction of the components, the true velocity of the particle in two dimensions is easily obtainable. The vector 53 represents such velocity.

While the invention has been described in connection with a preferred embodiment thereof, it will be appreciated that various changes and modifications can be made without departing from its spirit. In this connection, it is contemplated that the invention be also incorporated into velocimeters which provide two different velocity components in the plane normal to the bisector of the angle θ, such as by using the two dominant colors from an Argon ion laser, to thereby provide three different velocity measurements from which three-dimensional velocity can be determined. Moreover, improvements utilizing the basic present invention are possible. It is therefore intended that the coverage afforded applicant be limited only by the terms of the following claims and their equivalents.

I claim:

1. A Doppler velocimeter for measuring two velocity components of a particle comprising means for generating a first pair of beams of electromagnetic radiation which are coherent with respect to one another; means for focusing both of said beams at said particle for the scattering therefrom of electromagnetic radiation which has a Doppler shifted frequency and from which a Doppler shifted beam which corresponds to one of said coherent first pair of beams is separable; means for collecting at least a portion of said scattered electromagnetic radiation to provide a measurement indicative of the component of velocity of said particle along a first path normal to the bisector of the angle formed between said first pair of beams at their point of incidence on said particle, and means for comparing the Doppler shifted frequency of the radiation scattered by said particle from said one of said coherent beams with the frequency of said beam prior to said Doppler shift to provide a measurement indicative of the component of velocity of said particle along a second path substantially perpendicular to said first path.

2. The Doppler velocimeter of claim 1 wherein said means for generating said first pair of coherent beams of electromagnetic energy includes a laser for generating coherent light for said pair of beams, and means for dividing the output of said laser into said pair of beams.

3. The Doppler velocimeter of claim 1 wherein means are included for shifting the frequency of one of said first pair of coherent beams relative to the other to directionally bias a portion of the scattered electromagnetic radiation.

4. The Doppler velocimeter of claim 1 wherein said means for comparing the Doppler shifted wavelength of the radiation scattered by said particle from said one of said beams with the wavelength of said beam prior to said Doppler shift, includes means for separating said one of said pair of coherent beams into a first portion to be focused onto said particle for Doppler shifting of its frequency and a reference portion to be compared with the Doppler shifted wavelength of said first portion to provide said measurement indicative of said component of velocity on said second path; and means for shifting the frequency of said first portion of said beam prior to the Doppler shifting thereof by said particle, relative both to said reference portion thereof and to said other coherent beam to directionally bias both of said measurements of velocity components whereby said measurements also indicate the vector velocity of said particle in two-dimensional flow.

5. The Doppler velocimeter of claim 1 wherein said means for generating a first pair of coherent beams of electromagnetic radiation generates beams which are plane polarized and have differing directions of polarization; and said means for comparing the Doppler shifted frequency of the radiation scattered by said particle from said one of said beams, with the frequency of said beam prior to said Doppler shift includes means for combining a portion of said one coherent beam with a portion of the electromagnetic radiation scattered from said particle which corresponds thereto, to provide a heterodyned resultant representative of the amplitude and direction of the velocity of said particle along said second path.

6. The Doppler velocimeter of claim 5 wherein said means for collecting at least a portion of said scattered electromagnetic radiation to provide a measurement indicative of the component of velocity of said particle along said first path includes means for separating said scattered electromagnetic radiation into a pair of Doppler shifted beams corresponding individually to said pair of coherent beams, and means for individually collecting said Doppler shifted beams to provide two measurements of the component of said velocity along said first path which are combinable to eliminate undesired components of such measurements common to both of said beams.

7. The Doppler velocimeter of claim 5 whrein said means for comparing the Doppler shifted frequency of the radiation scattered by said particle from said one of said beams with the frequency of said beam prior to said Doppler shift, includes means for separating said one of said pair of coherent beams into a first portion to be focused onto said particle for Doppler shifting of its frequency and a reference portion to be compared with the Doppler shifted frequency of said first portion to provide said measurement indicative of said component of celocity on said second path; and means for shifting the frequency of said first portion of said beam prior to the Doppler shifting thereof by said particle, relative both to said reference portion thereof and to said other coherent beam to directionally bias both of said measurements of velocity components whereby said measurements also indicate the direction of said velocities along said paths.

8. The Doppler velocimeter of claim 5 wherein said means for generating a first pair of coherent beams of electromagnetic radiation generates plane polarized beams which have directions of polarization which are orthogonal with respect to one another.

9. A Doppler velocimeter of claim 8 wherein said means for generating said first pair of coherent beams of electromagnetic energy includes a laser for generating coherent light for said pair of beams, and means for dividing the output of said laser into said pair of coherent beams and separating one of said pair of beams into a first portion to be focused onto said particle for Doppler shifting of its frequency and a reference portion to be compared with the Doppler shifted frequency of said first portion to provide said measurement indicative of said component of velocity along said second path.

10. A Doppler velocimeter of claim 9 wherein said means for collecting at least a portion of said scattered electromagnetic radiation to provide a measurement indicative of the component of velocity of said particle along said first path includes means for separating said scattered electromagnetic radiation into a pair of Doppler shifted beams corresponding individually to said pair of coherent beams, and means for individually collecting said Doppler shifted beams to provide two measurements of the component of said velocity along said first path which are combinable to eliminate undesired components of such measurements common to both of said beams.

11. A velocimeter for developing signals representative of the velocity of a particle along first and second paths comprising:

means for generating first and second beams of coherent electromagnetic radiation;

means for converting said second beam of radiation to a directionally biased beam of radiation;

means for focusing said first beam of radiation and said biased beam of radiation upon said particle with radiation scattering from said particle and interference fringes produced at the intersection of said beams;

means for detecting a portion of said scattered radiation and generating a signal representative of the amplitude and direction of the velocity of said particle along a first path through said fringes and perpendicular to the bisector of the angle formed by the convergence of said first beam and said biased beam;

means for combining a portion of said first beam of radiation and a portion of said scattered radiation;

means for detecting said combined radiation and generating a beat signal representative of the amplitude and direction of the velocity of said particle along a second path substantially orthogonal to said first path.

12. A velocimeter as set forth in claim 11 wherein said biased beam of radiation has a different frequency than said first beam of radiation.

13. A velocimeter as set forth in claim 11 wherein said converting means comprises a Bragg cell and said biased beam of radiation has a different frequency than said first beam of radiation.

14. A velocimeter as claimed in claim 12 wherein said first and second beams are plane polarized and the plane of polarization of said first beam is orthogonal to the plane of polarization of said second beam.

* * * * *